Nov. 17, 1964   R. L. NORTON   3,157,826
DETECTOR FOR PHASE FAILURE IN POLYPHASE ELECTRICAL SYSTEMS
Filed Dec. 30, 1959
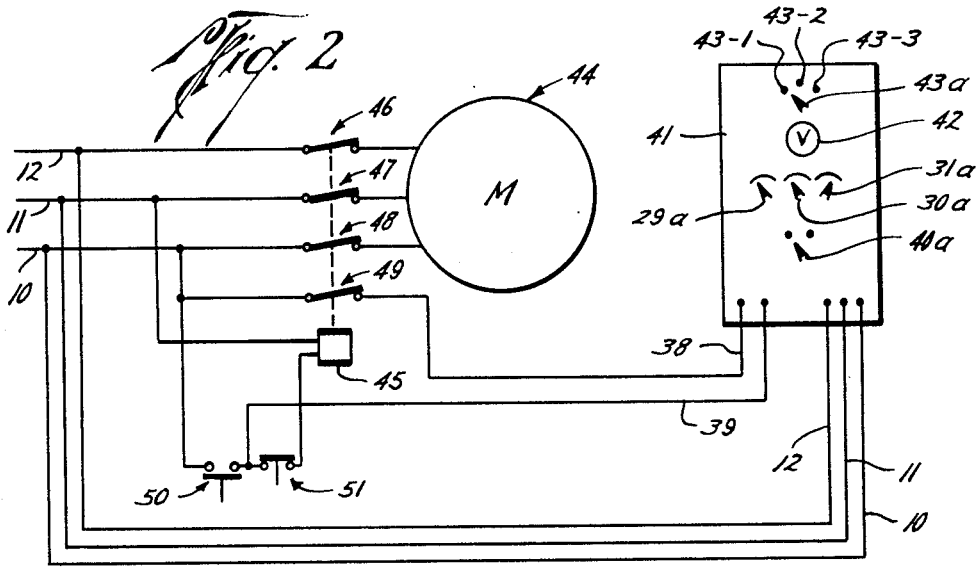
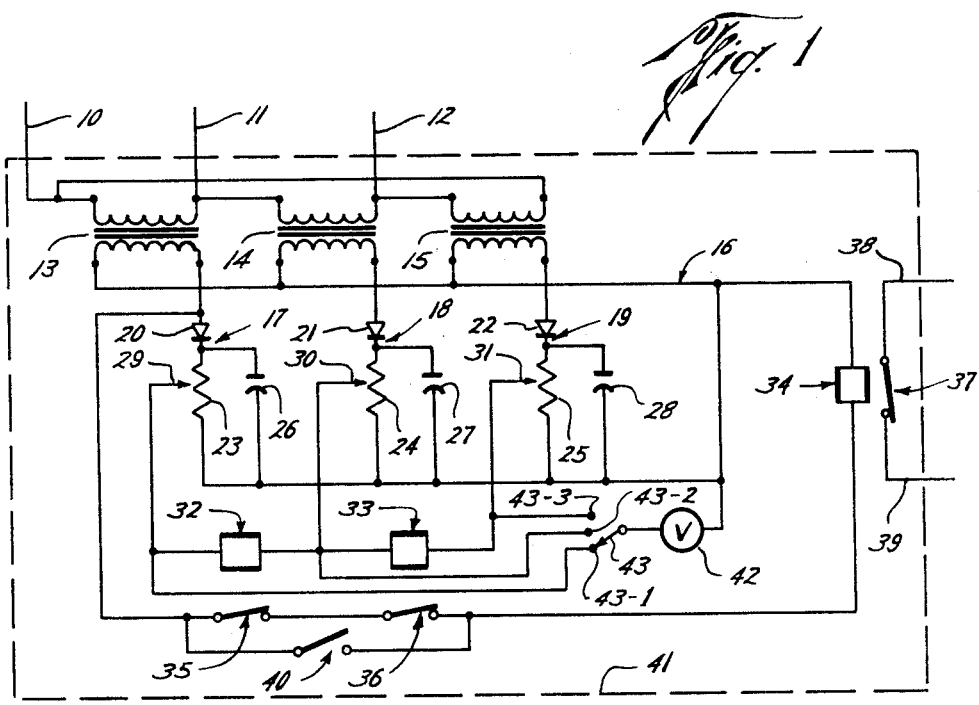
Robert L. Norton
INVENTOR.
BY Browning, Simmons, Hyer
& Eickenroht
ATTORNEYS

United States Patent Office 3,157,826
Patented Nov. 17, 1964

3,157,826
DETECTOR FOR PHASE FAILURE IN POLYPHASE ELECTRICAL SYSTEMS
Robert L. Norton, Houston, Tex., assignor to Powell Electrical Manufacturing Company, Houston, Tex., a corporation of Texas
Filed Dec. 30, 1959, Ser. No. 862,884
2 Claims. (Cl. 317—46)

This invention relates to a device for detecting a phase failure in polyphase sources of electric power.

For purposes of the following discussion and claims a "phase source" may be defined as any two conductors having a single phase of a polyphase power supply impressed upon them and available to supply current of that single phase to either a single phase load or part of a polyphase load. A "polyphase source" is defined as more than two such conductors having a polyphase power supply impressed upon them and available to supply such polyphase power to either a plurality of single phase loads or to a polyphase load. Any single conductor may of course be common to a plurality of phase sources.

Polyphase electric power sources and in particular the three-phase sources are in extensive use in industry to operate polyphase induction motors and other current consuming apparatus. The failure of one of the phase sources results in some of the polyphase apparatus operating under single-phase conditions. Operation under single-phase conditions of electrical apparatus designed for polyphase conditions will result in damage to them due to the excessive current passing therethrough under the non-normal phase conditions. Additionally, a phase failure results in at least a partial reduction of voltage therein. Naturally, operation under reduced voltage will produce excessive harmful currents in single-phase or polyphase apparatus operated therefrom.

A device automatically indicating the failure of one or more of the phases in polyphase sources is very desirable. Such devices must be adapted to give satisfactory operation under conditions existing in such polyphase sources connected to current consuming loads.

One of the conditions existing in polyphase sources is the generation of a counter voltage into the phase which has failed by certain apparatus connected thereto, such as electric induction motors. This counter voltage may be between 15 to 85 percent of the normal voltage in that phase. The device must therefore be capable of distinguishing the counter voltage from the normal operating voltage in the failed source.

Another condition is the variation of voltage in all the sources and between one and another of the sources during normal operation. These variations occur when the loading to the polyphase sources changes and the changes in loading may be caused by connection of large current consuming motors to the polyphase sources or to the changes in the work load applied to these motors. Additionally, some variations in voltage occur in the distribution systems of such polyphase sources. These variations are normal and should not activate the device to indicate phase failure.

The voltages in each phase of a polyphase source may not be identical under normal operating conditions. Thus the device should be capable of being adjusted to the actual voltages in each phase, which are normal and not necessarily identical.

There also exists the condition of unbalanced current distribution between the polyphase sources. This condition is created where there are single-phase loads connected between the polyphase sources in addition to polyphase loads. The current carried by any one phase source is not a fixed value but varies as the work load of the current consuming apparatus changes and as the number of such apparatus connected to the polyphase source changes. It is to be noted that under certain normal operating conditions some of the sources of the polyphase sources may carry different currents due to the above types of loads used in this system. The phase failure detection device should not be activated by such current changes or by the normal differences in current carried by the phase sources during normal operation.

The devices heretofore used have not been found to be satisfactory for one reason or another. These prior devices may be classed according to the electrical characteristic that is monitored. The classes of these devices are voltage sensing, current sensing, and phase sensing.

The voltage sensing devices utilized voltage sensitive relays which are adjusted to operate at a preset percentage difference in voltage from a given voltage. These devices operate when one or more of the phase voltages fall below that percentage difference from the given value. These devices do not compare one phase voltage with one or others of the remaining phase voltages, but use the total sum or difference of the voltages in all sources as the monitored voltage. Upon the preset percentage difference in this monitored voltage from the given voltage, the voltage sensing relay is activated. For this reason, the fluctuations in the polyphase voltages due to normal variations in distribution or the loading of the polyphase source by the equipment of a plant can activate these devices. This results in a false indication of phase failure.

The current sensing devices utilize current balanced transformers connected between the phase sources and such transformers must be closely matched to the current carried in each phase source. Naturally, these current sensing devices cannot be used where the total current in a polyphase system normally varies or an unbalancing of the currents between the phases normally occurs. Devices of this type are generally limited to polyphase sources where the current flow in each source is uniform and there are no changes in currents which unbalance the current relationship existing between phases. Connection of a single-phase apparatus to the polyphase sources would upset such a current balance and result in a false indication of phase failure by this type of device.

One of the types of phase sensing devices utilizes mechanical cams and trips driven by normally phase balanced induction motors operated from the phase sources. These devices have mechanical parts which become inoperative and fail to function, usually without disconnecting the polyphase apparatus from the polyphase sources. Since these devices operate upon the phase relationship between the polyphase sources, a temporary shift in the phase relationship between these phase sources would activate this type of device giving a false indication of phase failure.

It is, therefore, an object of the present invention to provide a novel device for detecting and indicating a phase failure in polyphase sources.

Another object is to provide a device capable of detecting and indicating a phase failure in polyphase sources where a counter voltage is generated into the phase which has failed.

A different object is to provide a device capable of detecting a difference in A.-C. voltage between one phase source and another or between one phase source and the remaining phase sources.

Another object is to provide a phase failure detection device that is usable with polyphase sources having a variable current loading and unequal currents in the phase sources such as results when polyphase and single-phase current operated devices are intermittently and simultaneously connected to a common polyphase source.

A different object is to provide a device of the present invention that is not falsely actuated by the normal fluctuations in the voltage in the polyphase sources.

Another object is to provide a device of the present invention that can be used on polyphase sources which have different voltages in each phase source under normal operating conditions.

A different object of the present invention is to provide a device that for its operation does not require the total sum or difference in the voltages or currents in the polyphase sources to reach a predetermined percentage of a given value before it is actuated.

Other objects, advantages and features of this invention will be apparent to one skilled in the art upon a consideration of the written specification, the attached claims and the annexed drawings.

In the drawings, wherein like reference characters are used throughout to designate like parts:

FIG. 1 is a schematic illustration of a novel phase failure detection device embodying this invention; and FIG. 2 is a diagrammatic illustration of the above detection device schematically connected to a polyphase motor which it protects in the event of failure of one or more of the phase sources.

Referring to FIGS. 1 and 2, a detailed description of a preferred embodiment of the present invention will be given.

The objects of the present invention are accomplished by a device having a D.-C. circuit between each of the voltage sources of a polyphase source and a conductor common to all of such phase sources. Means are provided in each such D.-C. circuit to establish a D.-C. voltage therein proportional to the A.-C. voltage in the phase source to which such D.-C. circuit is connected. Signal means responsive to unbalanced D.-C. potentials to indicate a phase failure are connected between the D.-C. circuits. The signal means are connected to the respective D.-C. circuits at substantially the same normal D.-C. potential. A phase failure will produce an unbalanced D.-C. voltage in such signal means to activate same.

This arrangement makes it possible to compare the voltage in one source to that in one or more of the other sources to detect the failure of one phase source.

More specifically, there is shown a plurality of phase A.-C. voltage source conductors 10, 11 and 12, together comprising a polyphase source. A like plurality of single-phase transformers 13, 14 and 15 are connected to the sources to electrically isolate the phase failure device from said sources and to provide A.-C. voltages to said device proportional to the A.-C. voltage in said sources.

The transformers are connected to said sources by primary windings connected to each phase of the polyphase sources. This phase connection is accomplished by connecting the primary windings in series and connecting the source conductors 10, 11 and 12 to common junctions between the windings as clearly shown in FIG. 1. This is commonly known as a "delta" connection.

A secondary winding is provided in each transformer and is adapted to produce some convenient A.-C. voltage usable in this novel device. One end of each secondary winding is connected to a junction and to a common conductor 16. The conductor 16 will be common to each of the other ends of the secondary and also to each of the source conductors 10, 11 and 12.

A plurality of D.-C. circuits 17, 18 and 19, to be more fully described thereafter, is connected between the other ends of the secondary windings and the common conductor 16.

The transformers may be found unnecessary where a four-wire, three-phase electrical system is available as the polyphase A.-C. voltage source and electrical isolation of this novel device from said source is not desired. In such instance, the neutral or fourth wire becomes the common conductor 16 and the polyphase source conductors are connected directly to D.-C. circuit 17, 18 and 19.

The D.-C. circuit 17, 18 and 19 have connected therein, in series, rectifier means 20, 21 and 22, respectively, and potential dropping means 23, 24 and 25, resepctively. Potential storing means 26, 27 and 28 are connected in shunt across respective potential dropping means 23, 24 and 25.

The rectifier means 20, 21 and 22 rectify the A.-C. voltage from the secondary winding of transformers 13, 14 and 15 to produce a D.-C. voltage and may be of any type capable of rectifying A.-C. voltage such as selenium rectifiers.

The potential dropping means limit the current passing through the rectifier means to a safe and desired value and may be of any type of electrical resistance, such as wire wound resistors. As a result of this current flow, each potential dropping means will have a certain D.-C. potential developed across it upon rectification of the A.-C. voltage.

The potential storing means provide a constant D.-C. voltage across the potential dropping means and may be of any type to accomplish this purpose such as electrolytic condensers.

The potential dropping means 23, 24 and 25 are provided with potential dividing taps 29, 30 and 31, respectively. The taps may take any form such as a fixed or variable contact on wire wound or carbon resistances. However, it has been found preferable to use a variable contact type in the form of a potentiometer for the potential dropping means and to provide a variable potential dividing tap. In this instance the fixed resistance portion of the potentiometer corresponds to the potential dropping means and the arm becomes the variable tap.

The D.-C. circuit as above described have provided means whereby a D.-C. potential is created in each such circuit proportional to the A.-C. voltage between the phase source conductor to which such D.-C. circuit is connected and the common conductor. Each of the variable taps 29, 30 and 31, may be adjusted to the same D.-C. potential. Of course, this latter selected D.-C. potential will be proportional to the A.-C. voltage between the phase source conductor to which the corresponding D.-C. circuit is connected and the common conductor.

A plurality of signal means 32 and 33 are provided to indicate the failure of one of the polyphase sources. The signal means are activated by an unbalanced D.-C. voltage applied to them. The signal means may be of any type adapted to be activated by an unbalanced D.-C. potential, such as lights, galvanometers or preferably D.-C. voltage relays as shown in this embodiment.

The use of a D.-C. relay as a signal means allows the device to not only detect and indicate a phase failure but also to be adapted to provide a load control means for disconnecting the polyphase source from its current consuming loads.

As shown in FIG. 1, the relays 32 and 33 are provided with electrical energizing windings adapted to operate the relay when subjected to an unbalanced D.-C. voltage. The energizing winding of relay 32 is connected between taps 29 and 30 in D.-C. circuits 17 and 18. The energizing winding of relay 33 is connected between taps 30 and 31 in D.-C. circuits 18 and 19.

A D.-C. voltmeter 42 is provided in conjunction with switch means 43 so that the D.-C. potentials at taps 29, 30 and 31 with respect to the common conductor 16 may be determined.

The switch means 43 may be of any convenient type for connecting the voltmeter to the taps and has positions corresponding to taps 29, 30 and 31 which positions are designated 43–1, 43–2 and 43–3.

Although the relays will give an indication of phase failure, it has been found that such relays may be easily adapted to disconnect the polyphase load from its polyphase source. For this purpose relays 32 and 33 are provided with electrical switch contacts 35 and 36 actuated by the operation of the relays.

The relay switch contacts 35 and 36 are connected in series with load controlling relay 34 in a circuit to be more fully described hereafter and these switch contacts have a bypass switch 40 connected in shunt.

The load controlling relay 34 is provided with an energizing winding and switch contacts 37 actuated by operation of the relay. The energizing winding is connected between one of the secondary windings of transformers 13, 14 or 15 with the switch contacts 35 and 36 interposed in this circuit. Thus, it can be seen that opening either one of the switch contacts 35 and 36 would de-energize the energizing winding of the load controlling relay opening switch contacts 37. The switch contacts 37 are connected to a load control means by conduits 38 and 39.

The bypass switch 40 allows the relay 34 to be energized while the taps 29, 30 and 31 in the D.-C. circuits are adjusted to normal operation or for test purposes.

It has been found desirable to place the transformers, relays and other portions of this novel device in a container 41 shown in FIG. 1 by a dotted outline.

The novel phase failure detection device of the present invention is adjusted and operates as follows.

With normal distribution voltages present in the polyphase source, the bypass switch 40 is closed activating relay 34 and switch contacts 37. This results in the load control means connecting the load to the polyphase source. Since the current consuming load may be polyphase, singlephase or a combination of both types of load, the currents and voltages in the source conductors 10, 11 and 12 probably will not be identical and most frequently are not identical. Thus, it is preferable to have all current consuming loads connected at the time of adjustment of this novel device.

A D.-C. potential is produced in each D.-C. circuit proportional to the A.-C. voltage in the source connected thereto. The voltages across each relay 32 and 33 are balanced by adjusting taps 29, 30 and 31 to substantially the same predetermined D.-C. voltage. When the D.-C. voltage is balanced across the relays 32 and 33, the windings of these relays are not energized and electrical switch contacts 35 and 36 remain closed completing the A.-C. energizing circuit of the load control relay 34.

After the D.-C. voltages are adjusted, the bypass switch 40 is opened and this novel device assumes automatic phase failure control.

When a phase failure occurs, a drop in the A.-C. voltage in one or more phase conductors results. Naturally, there is a proportional drop in the D.-C. voltage in the corresponding D.-C. circuit but not in the others. The change in D.-C. voltage in one D.-C. circuit causes the D.-C. voltage across one of the relays connected thereto to become unbalanced. This resultant unbalanced D.-C. voltage is proportional to the difference in the changes in A.-C. voltages in the source conductors. If the unbalance in A.-C. voltage is sufficient, as when a phase fails, there results an activating of one relay to give indication of such phase failure and a simultaneous opening of the electrical switch contacts actuated by that relay. Thus, phase failure detection and indication is accomplished and the load control relay is de-energized. As a result, the load control means disconnects the load from said source.

The D.-C. voltage at each of the taps 29, 30 and 31 is of a value such that normal voltage fluctuations in the sources are insufficient to cause an unbalanced D.-C. voltage of a sufficient magnitude to activate either of the relays. Additionally, the value should be such that the counter voltage generated into the failed phase by certain apparatus is not sufficient to produce a D.-C. potential sufficiently close to normal to maintain the D.-C. balance across the relays and prevent their actuation.

Examination of FIG. 1 shows that the D.-C. voltage may be easily selected in each D.-C. circuit by means of the variable taps. This D.-C. voltage can be set between a value approaching zero and the maximum D.-C. voltage available across the potential dropping means. However, the higher the D.-C. voltage obtained at the variable taps compared to the total D.-C. voltage across the potential dropping means, the greater the sensitivity of this novel device to changes in the voltages in the phase sources.

As an example, where the total D.-C. voltage across the potential dropping means is 300 volts and the unbalance in D.-C. voltage across the relays necessary to activate them is 10 volts, a setting of the taps 29, 30 or 31 at 100 volts will require a D.-C. voltage change caused by phase failure of 30 volts or more before one of the relays can be activated.

A setting of the taps at 200 volts would require a D.-C. voltage change of only 15 volts to cause an unbalanced D.-C. voltage of 10 volts. Thus, the sensitivity of the device at 200 volt settings of the taps would be twice that of 100 volt settings of the taps.

Clearly, the D.-C. voltage at which the taps are set can be predetermined at a value such that normal fluctuations are not of a sufficient magnitude to activate the relays and the counter voltage introduced into the phase which has failed is insufficient to prevent activation of the relays.

The D.-C. voltage setting at the taps can be determined for a given A.-C. voltage fluctuation and counter voltage since the D.-C. potential in the D.-C. circuit is proportional to the A.-C. voltage in the source conductor to which that circuit is connected and the unbalanced D.-C. voltage across the relays is proportional to total D.-C. voltage across the potential dropping means and the D.-C. voltage to which the taps are set.

Referring now to FIG. 2, a detailed description of a typical use of the novel device to control a polyphase load will be given. The load is shown as a polyphase motor.

A polyphase electric motor 44 is connected through a load control means to the polyphase source conductors 10, 11 and 12. The load control means is here shown as the usual motor controller relay 45 having an energizing winding and switch contacts 46, 47, 48 and 49 actuated by operation of the relay. The switch contacts 46, 47 and 48 are interposed in the sources to connect same to the motor 44. The contacts 49 are auxiliary contacts and are used in a load control circuit hereafter described and to bypass a starting switch 50. The switch 50 is of the type which opens upon removal of the force closing same.

The phase failure device is housed in container 41 and is diagrammatically illustrated with the controls thereon as follows. The bypass switch 40 has a control knob 43a extending outside of the container 41. The voltmeter 42 is placed so that its face is readily visible. The taps 29, 30 and 31 have control knobs 29a, 30a and 31a likewise extending outside of the container 41 as does the bypass switch knob 40a.

This novel device is connected to the motor controller relay and polyphase sources through the following load control circuit.

This control circuit has polyphase source conductors 11, 12 and 13 connected to the respective parts of the novel device as shown in FIGS. 1 and 2. Conduits 38 and 39 extend from container 41.

Conduit 38 is connected through auxiliary switch contacts 49 to source conductor 10. Conduit 39 is connected through a stop switch 51, through the energizing winding of the motor controller relay 45 to source conductor 11.

The starting switch 50 is connected between source conductor 10 and conduit 39.

Upon the novel device being adjusted for automatic phase failure detection as has been previously discussed, the circuit through conduits 38 and 39 is therefore completed by the closing of electrical switch contacts 37. The motor controller relay winding is energized closing switch contacts 46, 47, 48 and 49 so that the polyphase motor 44 is connected to source conductors 10, 11 and 12.

Upon a phase failure, as heretofore described, the circuit through conduits 38 and 39 is broken by the opening of the load control relay switch contacts 37. This results in de-energizing the motor controller relay 45 and opening the switch contacts actuated thereby.

The starting switch 50 is paralleled by auxiliary switch contacts 49 and therefore may be released upon the phase failure detector assuming automatic control.

The motor 44 can be stopped when desired by opening stopping switch 51.

The phase failure device and control circuits between the device and the motor controller relay 45 may be checked when the motor controller relay has disconnected the motor 44 from the polyphase source. Closing starter switch 50 will result in re-connecting the motor to the polyphase source where the control circuit has been broken by a defective stopping switch 51 and/or auxiliary contacts 49 upon normal voltages being present in the source. The phase failure device is functioning properly if the motor starts.

Should the motor fail to start by the above test, the bypass switch 40 is closed and the above test repeated. If the motor fails to start, there is a defective circuit condition in the control circuit. If the motor starts, some defect has arisen in the phase failure detector.

Naturally, the presence of normal operating voltages in the polyphase source can be readily determined by use of the meter swtch 43. The meter switch 43 is changed through positions 43-1, 43-2 and 43-3 to determine the presence of D.-C. voltages at the taps 29, 30 and 31. Should the predetermined D.-C. voltage be present, then failure of the motor to start under the above tests indicates a defect in the control circuit and not in the phase failure device.

Although in this embodiment the load control relay 34 is used to control the connection of the source to the motor by means of the motor controller relay, it is envisioned that the load control relay 34 may be provided with switch contacts 46, 47, 48 and 49 substituted for switch contacts 37. In such an arrangement the starter switch 50 would be connected in shunt to the bypass switch 40. The stopping switch 51 would be interposed in series with relay switch contacts 35 and 36. This arrangement would operate in the same manner as in the preferred embodiment.

It is evident that should the A.-C. voltages in all phase sources decrease proportionally in voltage below an A.-C. voltage for safe operation, a condition known as undervoltage occurs. The D.-C. voltages across the relays 32 and 33 would remain balanced under such undervoltage condition and hence would not become activated. Individual current consuming loads may be protected against undervoltage condition by thermal overload protectors. However, the present phase failure device can protect all loads connected to the polyphase source against the undervoltage condition.

The load control relay 34 may provide such undervoltage protection for the polyphase source. Automatic undervoltage protection for the polyphase source is provided by choosing an energizing winding for relay 34 that will de-energize at a certain voltage proportional to a predetermined permissible undervoltage in the source. Thus, a decrease in voltage in the source to the permissible undervoltage would not activate the relays 32 and 33 but would cause a reduction in the energizing of the winding on the load control relay 34 resulting in the opening of the switch contacts 37 and disconnecting the current consuming loads from the polyphase source.

The phase failure device for indicating the failure of one or more voltage sources in a polyphase system disclosed herein is simple in construction, automatic in operation to detect, indicate and disconnect the polyphase source from the current consuming loads. Additionally, undervoltage protection is provided for such loads.

The phase failure device has been herein described for use on a three-phase source of electrical power. However, the device is not limited to three-phase systems and may be used with any polyphase system by providing a D.-C. circuit for each polyphase source and signal means connected between the potential dividing taps on the potential dropping means in such D.-C. circuits.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A phase failure detector for use on an A.-C. polyphase system comprising, a plurality of phase voltage source conductors, a like plurality of single phase transformers, each having a primary and a secondary winding, a primary winding connected to each of the phases of said polyphase source, one end of each of said secondary winding connected to a common conductor, a plurality of D.-C. circuits, one of said D.-C. circuits connected between the other ends of said secondary windings and the common conductor, said D.-C. circuits each having a rectifier means and a potential dropping means connected in series therein, said potential dropping means having a variable potential dividing tap, and a potential storing means shunting said potential dropping means, a plurality of signal means responsive to D.-C. voltage differentials to indicate phase failure, one of said signal means connected between the potential dividing taps in a first and second of said D.-C. circuits, another signal means connected between the potential dividing tap in a third of said D.-C. circuits and the potential dividing tap in the second of said D.-C. circuits, the potential dividing taps adjusted to balance the D.-C. voltage across each signal means when normal operational voltages are present in the sources and to produce an unbalanced D.-C. voltage across one signal means to activate same upon a predetermined unbalance in A.-C. voltage between any two source conductors or between one source conductor and the remaining source conductors.

2. A phase failure detector for use on an A.-C. polyphase system comprising, a plurality of phase voltage source conductors, a conductor common to each of said conductors, a plurality of D.-C. circuits, one of said D.-C. circuits connected between each phase source conductor and the common conductor, said D.-C. circuits each having connected in series therein a rectifier means and a potential dropping means, said potential dropping means having a variable potential dividing tap, a first relay having an energizing winding and electrical switch contacts actuated thereby, said winding connected between the potential dividing taps in a first and second of said D.-C. circuits, a second relay having an energizing winding and contacts actuated thereby, said latter winding having one end connected to the potential dividing tap in a third of said D.-C. circuits and the other end connected to the potential dividing tap in the second of said D.-C. circuits, said first and second relay contacts connected in series, a load controlling relay having an energizing winding and a plurality of contacts actuated thereby, said control relay contacts interposed in the source conductors and connecting said source to a load therefor, the energizing winding of said load controlling relay connected between one of said source conductors and the common conductor and in series with the first and second relay contacts, the potential dividing taps adjusted to balance the voltage across each first and second relay winding when normal operational voltages are present in the source conductors and to produce an unbalanced D.-C. voltage across one of the first and second relays to de-energize the load controlling relay thereby disconnecting said source from the load upon a predetermined unbalance in voltage between any two source conductors or between one source conductor and the remaining source conductors.

References Cited in the file of this patent

UNITED STATES PATENTS

| | | |
|---|---|---|
| 1,314,332 | Jones | Aug. 26, 1919 |
| 1,888,718 | Friedlander | Nov. 22, 1932 |
| 2,242,950 | Harder | May 20, 1941 |
| 3,021,453 | Faglie | Feb. 13, 1962 |
| 3,056,067 | Luber | Sept. 25, 1962 |